(12) United States Patent
Wei et al.

(10) Patent No.: US 11,454,215 B2
(45) Date of Patent: Sep. 27, 2022

(54) METHOD FOR RAMPING UP POWER IN A POWER FACILITY

(71) Applicant: VESTAS WIND SYSTEMS A/S, Aarhus N (DK)

(72) Inventors: Mu Wei, Solbjerg (DK); Kouroush Nayebi, Ikast (DK); Torsten Lund, Fredericia (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/754,854

(22) PCT Filed: Oct. 2, 2018

(86) PCT No.: PCT/DK2018/050243
§ 371 (c)(1),
(2) Date: Apr. 9, 2020

(87) PCT Pub. No.: WO2019/072346
PCT Pub. Date: Apr. 18, 2019

(65) Prior Publication Data
US 2021/0199090 A1    Jul. 1, 2021

(30) Foreign Application Priority Data
Oct. 10, 2017  (DK) .............. PA201770768

(51) Int. Cl.
*F03D 7/04*     (2006.01)
*F03D 9/25*     (2016.01)
*F03D 7/02*     (2006.01)

(52) U.S. Cl.
CPC ........... *F03D 7/048* (2013.01); *F03D 7/0284* (2013.01); *F03D 9/257* (2017.02); *F05B 2270/337* (2013.01); *H02J 2300/28* (2020.01)

(58) Field of Classification Search
CPC ........ F03D 7/048; F03D 9/257; F03D 7/0284; H02J 2300/28; H02J 3/48; H02J 3/381;
(Continued)

(56) References Cited

U.S. PATENT DOCUMENTS

2004/0095020 A1\* 5/2004 Kernahan ............... G05F 3/262
307/35
2004/0207207 A1\* 10/2004 Stahlkopf ................. F03D 9/10
290/44
(Continued)

FOREIGN PATENT DOCUMENTS

EP      2481923 A1    8/2012
EP      2530308 A2    12/2012
(Continued)

OTHER PUBLICATIONS

Danish Search Report for Application No. PA 2017 70768 dated Apr. 11, 2018.
(Continued)

*Primary Examiner* — Ziaul Karim
(74) *Attorney, Agent, or Firm* — Patterson + Sheridan, LLP

(57) ABSTRACT

The present invention relates to a method for releasing a requested amount of power from a power facility to an associated power grid, the method comprising the steps of providing a release signal as to when the requested amount of power is to be released from the power facility to the associated power grid, ramping up the power generation of the power facility, and releasing the requested amount of power to the associated power grid in accordance with the release signal, wherein at least part of an excess power generated during ramping up is dissipated and/or stored in (Continued)

suitable power handling modules. The present invention also relates to a power facility controller being capable for performing this method.

18 Claims, 3 Drawing Sheets

(58) Field of Classification Search
CPC ...... H02J 3/32; F05B 2270/337; Y02E 10/76; Y02E 70/30
See application file for complete search history.

(56) References Cited

U.S. PATENT DOCUMENTS

| | | | | |
|---|---|---|---|---|
| 2004/0245783 | A1* | 12/2004 | Gilbreth | H02J 1/10 290/52 |
| 2010/0138058 | A1 | 6/2010 | Kirchner et al. | |
| 2012/0261917 | A1* | 10/2012 | Egedal | F03D 9/257 290/44 |
| 2014/0103655 | A1 | 4/2014 | Burra et al. | |
| 2014/0142776 | A1 | 5/2014 | Nielsen et al. | |
| 2015/0022007 | A1 | 1/2015 | Ma et al. | |
| 2016/0094035 | A1 | 3/2016 | Vor Dem Esche et al. | |
| 2017/0102434 | A1* | 4/2017 | Wenzel | G06Q 50/06 |
| 2017/0104332 | A1* | 4/2017 | Wenzel | G01R 31/392 |
| 2017/0104336 | A1* | 4/2017 | ElBsat | H02J 7/35 |
| 2017/0104342 | A1* | 4/2017 | ElBsat | H02J 3/32 |
| 2017/0104343 | A1* | 4/2017 | Elbsat | H02J 3/32 |

FOREIGN PATENT DOCUMENTS

| | | |
|---|---|---|
| WO | 2012177633 A2 | 12/2012 |
| WO | 2019072346 A1 | 4/2019 |

OTHER PUBLICATIONS

PCT Written Opinion of The International Searching Authority for PCT/DK2018/050243 dated Apr. 11, 2018.
European Patent Office, Communication of a Notice of Opposition for Application 18782883.5-1202/3695479 dated Jul. 6, 2022.

* cited by examiner

METHOD FOR RAMPING UP POWER IN A POWER FACILITY

FIELD OF THE INVENTION

The present invention relates to a method for ramping up active power in a power facility. In particular, the present invention relates to a method for ramping up the active power generation of a power facility prior to releasing the ramped up active power to an associated power grid in order to support a rapid increase of consumption.

BACKGROUND OF THE INVENTION

Normally, wind turbines or wind power plants (WPP) produce the maximal power which is available at the given wind speed. By reducing the power output, it is, however, possible to use wind turbines for frequency control. A possible grid parameter being indicative of a lack of active power is the grid frequency which decreases if the amount of active power delivered to the power grid is too small. To change the power production, the pitch angle of the blades must be adapted, and the change will lead to structural loads on towers, blades etc. The turbine therefore has a finite ramp rate for changing the power. In case of a voltage dip in the power grid, the reactive output power of the wind turbine is decreased immediately. To avoid large structural loads and to reduce the risk of over speed of the rotor, most wind turbines are equipped with a controlled resistor (also denoted a chopper) which can dissipate the excess power during grid voltage dip.

According to WO 2013/013174 A2 electrical power may be accumulated and/or stored in a wind turbine generator for later use. WO 2013/013174 A2 specifically teaches that upon receipt of a control signal energy accumulated and/or stored in a wind turbine generator may be released via a switch that closes.

A drawback of the proposal set forth in WO 2013/013174 A2 is that the power generating unit is not warned beforehand, i.e. the power generating unit is not given the opportunity to establish a reservoir of power that may be released at a predetermined time.

It may thus be seen as an object of embodiments of the present invention to provide a method for ramping up power in a power facility, and releasing the ramped up power to an associated power grid in accordance with a release signal.

DESCRIPTION OF THE INVENTION

The above-mentioned object is complied with by providing, in a first aspect, a method for releasing a requested amount of power from a power facility to an associated power grid, the method comprising the following sequential steps:
1) providing a release signal as to when the requested amount of power is to be released from the power facility to the associated power grid,
2) ramping up the power generation of the power facility, and
3) releasing the requested amount of power to the associated power grid in accordance with the release signal
wherein at least part of an excess power generated during ramping up is dissipated and/or stored in suitable power handling modules.

Thus, according to the method of the present invention the power generation of the power facility may be increased by a requested amount before said requested amount of power is released to the associated power grid. Information about the requested amount of power and the time of releasing the requested amount of power may be part of the release signal. The release signal may thus provide an exact time as to when the requested amount of power is to be released. Alternatively, or in combination therewith, the release signal may provide a time period setting the time of release of the requested amount of power.

The release signal may be provided for various reasons, such as in response to a measured parameter of the associated power grid. As an example, the release signal may be triggered by a decreasing grid frequency. Thus, if the grid frequency decreases a predetermined value, such as between 0.1% and 0.2% of the nominal grid frequency, a release signal may request that a certain amount of active power is provided in order to support the associated power grid. The release signal may be provided by a variety of associates, including the operator of the associated power grid.

The term power facility should be interpreted broadly and it may thus comprise a wind power facility in the form of a WPP comprising a plurality of wind turbine generators (WTGs). The WPP may be connected to the associated power grid via a point of common coupling (PCC).

In an embodiment of the present invention the power provided to the associated power grid may be maintained at a substantially unchanged level while ramping up the power generation of the power facility. In order to comply with this, at least part of the excess power generated during ramping up is dissipated and/or stored in suitable power handling modules which may comprise chopper resistors and/or batteries.

The method of the present invention is advantageous in that the power generation of the power facility may be ramped up in advance so that the requested amount of power is ready to be released at the time specified by the release signal. The requested amount of power may be released at one time or it may be released in a step-wise or continuously decreasing manner.

The power generation of the power facility may be ramped up with an amount at least corresponding to the requested amount of power. Preferably, the power generation of the power facility is ramped up with an amount that corresponds to the amount of power requested in the release signal.

As previously addressed, the power facility may comprise a WPP comprising a plurality of WTGs. In this embodiment of the invention, a number of the plurality of WTGs may each generate a portion of the requested amount of power to be released to the associated power grid. The portion provided by each WTG may be set in accordance with the power capabilities of the individual WTGs. In order to handle the excess power generated before releasing it to the associated power grid a number of the plurality of WTGs may each comprise suitable power handling modules, such as chopper resistors and/or batteries, for dissipating and/or storing excess power.

The requested amount of power released from the power facility may be used for various purposes, such as for powering loads during power restoration, e.g. black start, after a power outage. Alternatively, or in combination therewith, the requested amount of power released from the power facility may also be used for powering loads in isolated power grids being supplied with a proportionally large amount of power from wind turbine facilities.

In a second aspect the present invention relates to a power facility for providing power to an associated power grid, the power facility comprising a power facility controller adapted to perform the following sequential steps 1) receive a release signal as to when a requested amount of power is to be released from the power facility to the associated power grid,
2) ramping up the power generation of the power facility, and
3) releasing the requested amount of power to the associated power grid in accordance with the release signal wherein the power facility further comprises one or more suitable power handling modules for dissipating and/or storing excess power generated during ramping up.

Again, the term power facility should be interpreted broadly and it may thus comprise a WPP comprising a plurality of WTGs. Similarly, the term power facility controller should be interpreted broadly and may thus comprise a WPP controller and/or one or more WTG controllers.

According to the second aspect the power facility controller may be adapted to maintain the power provided to the associated power grid at a substantially unchanged level while ramping up the power generation of the power facility. To facilitate this embodiment one or more suitable power handling modules for dissipating and/or storing excess power generated during ramping up is provided. Suitable power handling modules may comprise one or more power dissipation and/or power storing modules, such as chopper resistors and/or batteries.

In case the power facility comprises a WPP comprising a plurality of WTGs a number of the plurality of WTGs may be adapted to generate a portion of the requested amount of power to be released to the associated power grid. Again, the portion provided by each WTG may be set in accordance with the power capabilities of the individual WTGs. Also, a number of the plurality of WTGs may each comprise suitable power handling modules.

BRIEF DESCRIPTION OF THE DRAWINGS

The present invention will now be described in further details with reference to the accompanying figures, wherein.

Figure 1:
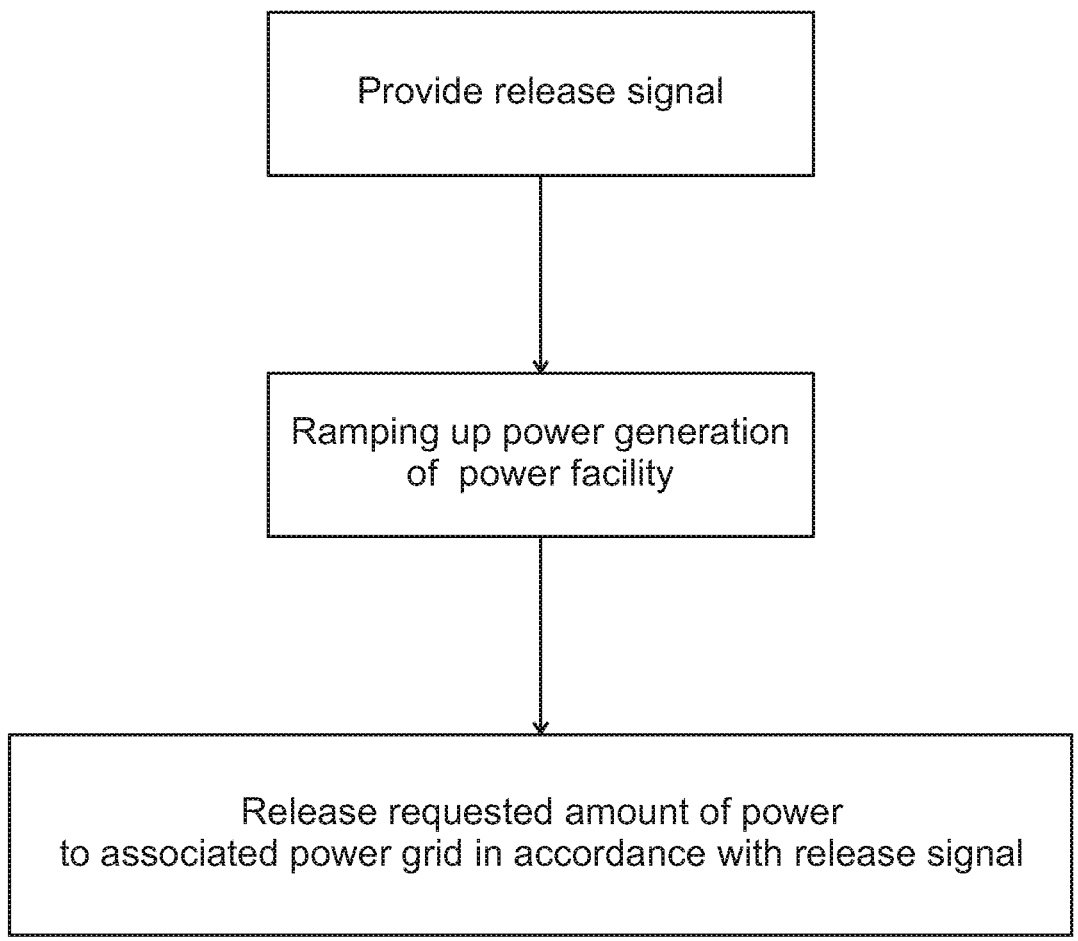
FIG. 1 shows a flow chart of the method of the present invention.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In its most general aspect the present invention relates to a method and a power facility where the generation of power by the power facility is increased by a predetermined amount before said predetermined amount of power is set to be released, i.e. delivered to an associated power grid. The predetermined amount of power as well as the time of release are defined in a release signal typically being provided of the operator of the associated power grid. The underlying reason for requesting more power from the power facility may be various, including a decrease of the grid frequency and/or an expected large load.

Referring now to FIG. 1 the method of the present invention is depicted in the form of a flow chart. As seen in FIG. 1 the first step of the method involves that a release signal is provided by for example the operator of the associated power grid. The release signal provides information about a requested amount of power, i.e. the amount of active power required, and when the requested amount of power is to be released from the power facility to the associated power grid.

In response to the provided release signal the controller of the power facility initiates a process that involves a ramping up the power generation of the power facility. The ramping up may be performed as a continuous or step-wise process until at least the requested amount of power has been reached.

As previously addressed the power facility may be wind power facility in the form of a WPP. The ramping up of the power generation may be provided by a single power generating unit or a plurality of power generating units, such as a plurality of WTGs within a WPP. In case the requested amount of power is generated by a plurality of WTGs within a WPP the generated power may for example be divided between the WTGs in accordance with the power capability of each of the WTGs.

During the ramping up the active power delivered to the associated grid is essentially maintained at its original level, i.e. no additional active power is delivered to the associated power grid during ramping up. Instead excess power is dissipated and/or stored in one or more power dissipation and/or power storing modules, such as chopper resistors and/or batteries. The one or more power dissipation and/or power storing modules may be distributed among a plurality of WTGs. Alternatively or in combination therewith, one or more WTGs may be operated in motor mode in order to dissipate power.

At the actual time, or time period, defined by the release signal the requested amount of power is released to the associated power grid. The release of the requested amount of power may be performed at one time or it may be released in a step-wise or continuously decreasing manner. Upon release of the requested amount of power to the associated power grid the amount of dissipated and/or stored power in the one or more power dissipation and/or power storing modules is reduced accordingly.

After release of the requested amount of power to the associated power grid the one or more power dissipation and/or power storing modules typically need to cool before being capable of dissipating and/or storing power again.

Figure 2:
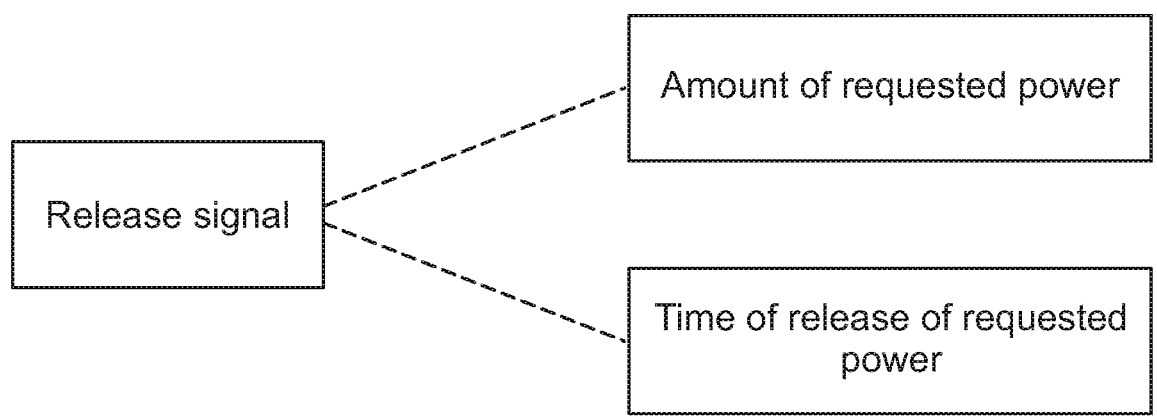
FIG. 2 shows information relating to the release signal.

As illustrated in FIG. 2 the release signal may provide information about the requested amount of power, i.e. the additional amount of power required, and the time at which the requested amount of power is to be released. The time of release may be provided as an exact time or as a time period set from the time of delivery of the release signal. Also, the release signal may provide information as to how the requested amount of power should be released, i.e. should the requested power be delivered at one time or should it be delivered over a time period, such as in a step-wise or continuously decreasing manner.

Figure 3:
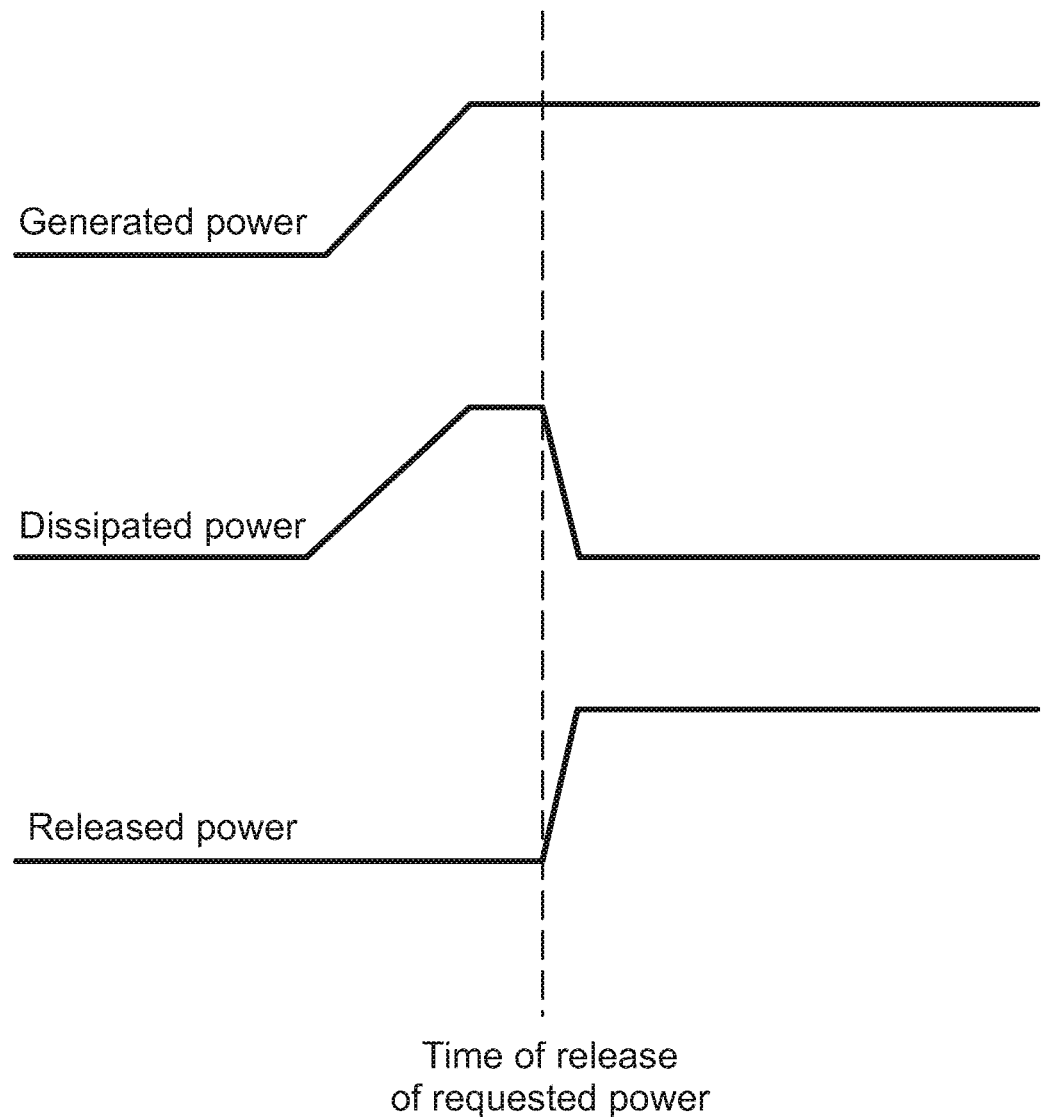
FIG. 3 shows the power generation, power dissipation and power release in the time domain.

FIG. 3 shows how the power generation, the power dissipation (and/or storage) and the power release evolve over time. In the upper graph of FIG. 3 the increasing power generation by the power facility is depicted. With reference to FIG. 2 the release signal may provide information about the requested amount of power, i.e. the additional amount of power required, and the time at which the requested amount of power is to be released as indicated by the horizontal dashed line. Since the increased amount of power may not be released to the associated power grid the power needs to be dissipated (and/or stored) until such a release is allowed. At the time of release, i.e. at the dashed line in FIG. 3, the dissipated (and/or stored) amount of power decreases rapidly, and the amount of released power to the associated power grid increases correspondently, cf. the middle and lower graphs of FIG. 3. After the time of release the generated power and the power provided to the associated power grid may be maintained at the increased power level.

The invention claimed is:

1. A method for releasing a requested amount of power from a wind power plant to an associated power grid, the method comprising:
   generating, by the wind power plant, an initial amount of power;
   in response to a release signal indicating a time when the requested amount of power is to be released from the wind power plant to the associated power grid, ramping up power generation of the wind power plant;
   at least one of dissipating or storing, in power handling modules, an amount of power generated by the wind power plant in excess of the initial amount of power while ramping up the power generation of the wind power plant; and
   releasing the requested amount of power from the wind power plant to the associated power grid according to the time indicated by the release signal to power selected loads during power restoration.

2. The method according to claim 1, wherein power provided to the associated power grid is maintained while ramping up the power generation of the wind power plant.

3. The method according to claim 1, wherein the power generation of the wind power plant is ramped up with an amount at least corresponding to the requested amount of power.

4. The method according to claim 1, wherein the release signal provides an exact time as to when the requested amount of power is to be released.

5. The method according to claim 1, wherein the power handling modules comprise chopper resistors or batteries.

6. The method according to claim 1, wherein the wind power plant comprises a plurality of wind turbine generators.

7. The method according to claim 6, wherein a number of the plurality of wind turbine generators each generates a portion of the requested amount of power to be released to the associated power grid.

8. The method according to claim 6, wherein a number of the plurality of wind turbine generators each comprise power handling modules.

9. The method according to claim 1, wherein the release signal is provided by an operator of the associated power grid.

10. A wind power plant for providing power to an associated power grid, the wind power plant comprising a controller adapted to:
    control the wind power plant to generate an initial amount of power;
    in response to a release signal indicating a time when a requested amount of power is to be released from the wind power plant to the associated power grid, ramp up power generation of the wind power plant;
    at least one of dissipate or store, in power handling modules, an amount of power generated by the wind power plant in excess of the initial amount of power while ramping up the power generation of the wind power plant; and
    release the requested amount of power from the wind power plant to the associated power grid according to the time indicated by the release signal to power selected loads during power restoration.

11. The wind power plant according to claim 10, wherein the controller is further adapted to maintain the power provided to the associated power grid while ramping up the power generation of the wind power plant.

12. The wind power plant according to claim 10, wherein the power handling modules comprise chopper resistors batteries.

13. The wind power plant according to claim 10, wherein the wind power plant comprises a plurality of wind turbine generators, and wherein a number of the plurality of wind turbine generators are adapted to generate a portion of the requested amount of power to be released to the associated power grid.

14. The wind power plant according to claim 13, wherein a number of the plurality of wind turbine generators each comprise power handling modules.

15. A method for releasing a requested amount of power from a wind power plant to an associated power grid, the method comprising:
    generating, by the wind power plant, an initial amount of power;
    in response to a release signal indicating an exact time when the requested amount of power is to be released from the wind power plant to the associated power grid, ramping up power generation of the wind power plant, wherein power provided to the associated power grid is maintained while ramping up the power generation of the wind power plant;
    at least one of dissipating or storing, in power handling modules, an amount of power generated by the wind power plant in excess of the initial amount of power while ramping up the power generation of the wind power plant; and
    releasing the requested amount of power from the wind power plant to the associated power grid according to the exact time indicated by the release signal to power selected loads during power restoration.

16. The method according to claim 15, wherein the power handling modules comprise chopper resistors or batteries.

17. The method according to claim 15, wherein the wind power plant comprises a plurality of wind turbine generators and wherein a number of the plurality of wind turbine generators each generate a portion of the requested amount of power to be released to the associated power grid.

18. The method according to claim 15, wherein the release signal is provided by an operator of the associated power grid.

* * * * *